(12) United States Patent
Buckland

(10) Patent No.: US 6,785,783 B2
(45) Date of Patent: Aug. 31, 2004

(54) NUMA SYSTEM WITH REDUNDANT MAIN MEMORY ARCHITECTURE

(75) Inventor: Pat Allen Buckland, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 665 days.

(21) Appl. No.: 09/726,288

(22) Filed: Nov. 30, 2000

(65) Prior Publication Data

US 2002/0065998 A1 May 30, 2002

(51) Int. Cl.[7] .............................................. G06F 12/00
(52) U.S. Cl. ...................................... 711/153; 711/162
(58) Field of Search ................................ 711/148, 153, 711/162

(56) References Cited

U.S. PATENT DOCUMENTS

| | | | | |
|---|---|---|---|---|
| 5,177,744 A | * | 1/1993 | Cesare et al. | 714/6 |
| 5,469,542 A | * | 11/1995 | Foster et al. | 709/224 |
| 5,495,570 A | * | 2/1996 | Heugel et al. | 714/11 |
| 6,035,411 A | * | 3/2000 | Yomtoubian | 714/6 |

FOREIGN PATENT DOCUMENTS

JP     2001075741 A  *  3/2001  ............ G06F/03/06

* cited by examiner

Primary Examiner—Kevin Verbrugge
(74) Attorney, Agent, or Firm—Joseph P. Lally; Mark E. McBurney

(57) ABSTRACT

A method and system for managing data in a data processing system are disclosed. Initially, data is stored in a first portion of the main memory of the system. Responsive to storing the data in the first portion of main memory, information is then stored in a second portion of the main memory. The information stored in the second portion of main memory is indicative of the data stored in the first portion. In an embodiment in which the data processing system is implemented as a multi-node system such as a NUMA system, the first portion of the main memory is in the main memory of a first node of system and the second portion of the main memory is in the main memory of a second node of the system. In one embodiment, storing information in the second portion of the main memory is achieved by storing a copy of the data in the second portion. If a fault in the first portion of the main memory is detected, the information in the second main memory portion is retrieved and stored to a persistent storage device. In another embodiment, storing information in the second portion of the main memory includes calculating a value based on the corresponding contents of other portions of the main memory using an algorithm such as checksum, parity, or ECC, and storing the calculated value in the second portion. In one embodiment, the main memory of at least one of the nodes is connectable to a persistent source of power, such as a battery, such that the main memory contents may be preserved if system power is disabled.

13 Claims, 5 Drawing Sheets

NUMA SYSTEM WITH REDUNDANT MAIN MEMORY ARCHITECTURE

BACKGROUND

1. Field of the Present Invention

The present invention generally relates to the field of data processing systems and more particularly to a non-uniform memory architecture (NUMA) system in which main memory data is backed-up on one or more other nodes of the NUMA system using RAID-like techniques to improve fault tolerance and reduce the amount of time spent storing data to permanent storage.

2. History of Related Art

In the field of microprocessor based data processing systems, the use of multiple processors to improve the performance of a computer system is well known. In a typical multi-processor arrangement commonly referred to as a symmetric multi-processor (SMP) system, a set of processors access a system memory via a shared bus referred to herein as the system or local bus. The use of a shared bus presents a scalability limitation. More specifically, the shared bus architecture ultimately limits the ability to improve performance by connecting additional processors to the system bus, after a certain point, the limiting factor in the performance of a multiprocessor system is the bandwidth of the system bus. Roughly speaking, the system bus bandwidth is typically saturated after four processors have been attached to the bus. Incorporating additional processors beyond four generally results in little, if any, performance improvement.

To combat the bandwidth limitations of shared bus systems, distributed memory systems, in which two or more SMP systems (referred to as nodes) are connected to form a larger system, have been proposed and implemented. One example of such a system is referred to as a non-uniform memory architecture (NUMA) system. A NUMA system is comprised of multiple nodes, each of which may include its own processors, local memory, and corresponding system bus. The memory local to each node is accessible to the other nodes via an interconnect network (referred to herein as the NUMA fabric) that links the various nodes. The use of multiple system busses (one for each node) enables NUMA systems to employ additional processors without incurring the system bus bandwidth limitation experienced by single bus systems.

For many data processing applications, reliably maintaining the application's data is of paramount importance. The reliability of data is conventionally maintained by periodically backing up the data in main memory data to persistent or non-volatile memory. Referring to FIG. 1, a data processing system 100 is illustrated in block diagram format. Data processing system 100 may include one or more nodes 102. Each node 102 includes one or more processors 104 that access a local memory 108 via a memory controller 106. A cache memory (not explicitly shown in FIG. 1) may reside between a processor and the memory controller). Nodes 102 may share a common, persistent mass storage device or devices identified in FIG. 1 as disk 112. If multiple disks are used, they may be arranged as a redundant array of inexpensive disks (RAID) to assure high availability of the data. RAID designs are described in Source, which is incorporated by reference herein.

Local memory 108 is typically implemented with dynamic random access memory (DRAM) that is susceptible to power loss, but has a significantly faster access time than disk 112. The application data stored in local memory 108 is periodically written back to disk 112 to protect against data loss from an unexpected event such as a power outage or node crash. The frequency with which data in local memory 108 is written back to disk 112 is a function the particular application and the rate at which data accumulates in local memory 108. Data intensive applications may require frequent disk backups to guard against loss of a large amount of data. The time required to write data to or retrieve data from disk 112 (the disk access time) is characteristically orders of magnitude greater than the access time of RAM 108. Application performance may, therefore, suffer in data intensive applications requiring frequent disk backup. It would be highly desirable, therefore, to implement a system in which data is maintained with sufficient reliability in a high-speed memory to enable less frequent disk backup thereby enhancing system performance.

SUMMARY OF THE INVENTION

The problem identified above is addressed by a method and system for managing data in a data processing system as disclosed herein. Initially, data is stored in a first portion of the main memory of the system. Responsive to storing the data in the first portion of main memory, information is then stored in a second portion of the main memory. The information stored in the second portion of main memory is indicative of the data stored in the first portion. In an embodiment in which the data processing system is implemented as a multi-node system such as a NUMA system, the first portion of the main memory is in the main memory of a first node of system and the second portion of the main memory is in the main memory of a second node of the system. In one embodiment, storing information in the second portion of the main memory is achieved by storing a copy of the data in the second portion. If a fault in the first portion of the main memory is detected, the information in the second main memory portion is retrieved and stored to a persistent storage device. In another embodiment, storing information in the second portion of the main memory includes calculating a value based on the corresponding contents of other portions of the main memory using an algorithm such as checksum, parity, or ECC, and storing the calculated value in the second portion. In one embodiment, the main memory of at least one of the nodes is connectable to a persistent source of power, such as a battery, such that the main memory contents may be preserved if system power is disabled.

BRIEF DESCRIPTION OF THE DRAWINGS

Other objects and advantages of the invention will become apparent upon reading the following detailed description and upon reference to the accompanying drawings in which.

Figure 1:
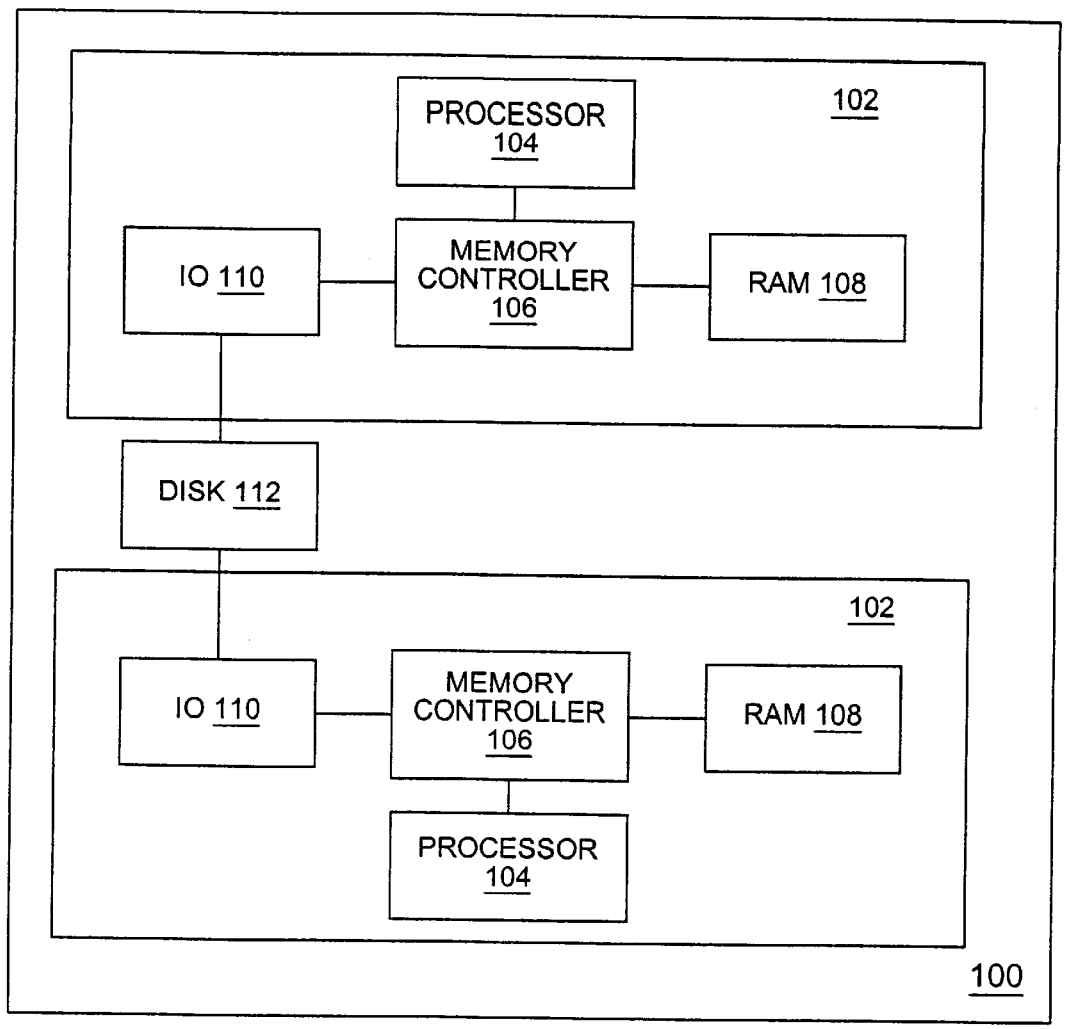
FIG. 1 is a block diagram of a data processing system according to the prior art.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the invention contemplates a multi-node data processing system in which redundant copies of system memory are stored on different nodes of the system. Preferably, the redundancy is implemented in a manner that ensures that the loss of data associated with any single node is recoverable from system memory on the remaining nodes of the system. In this manner, data reliability is improved while simultaneously reducing dependency on persistent storage devices. Combining the system memory redundancy strategy disclosed herein with a continuously powered memory (CPM) design further improves the reliability of the data.

Figure 2:
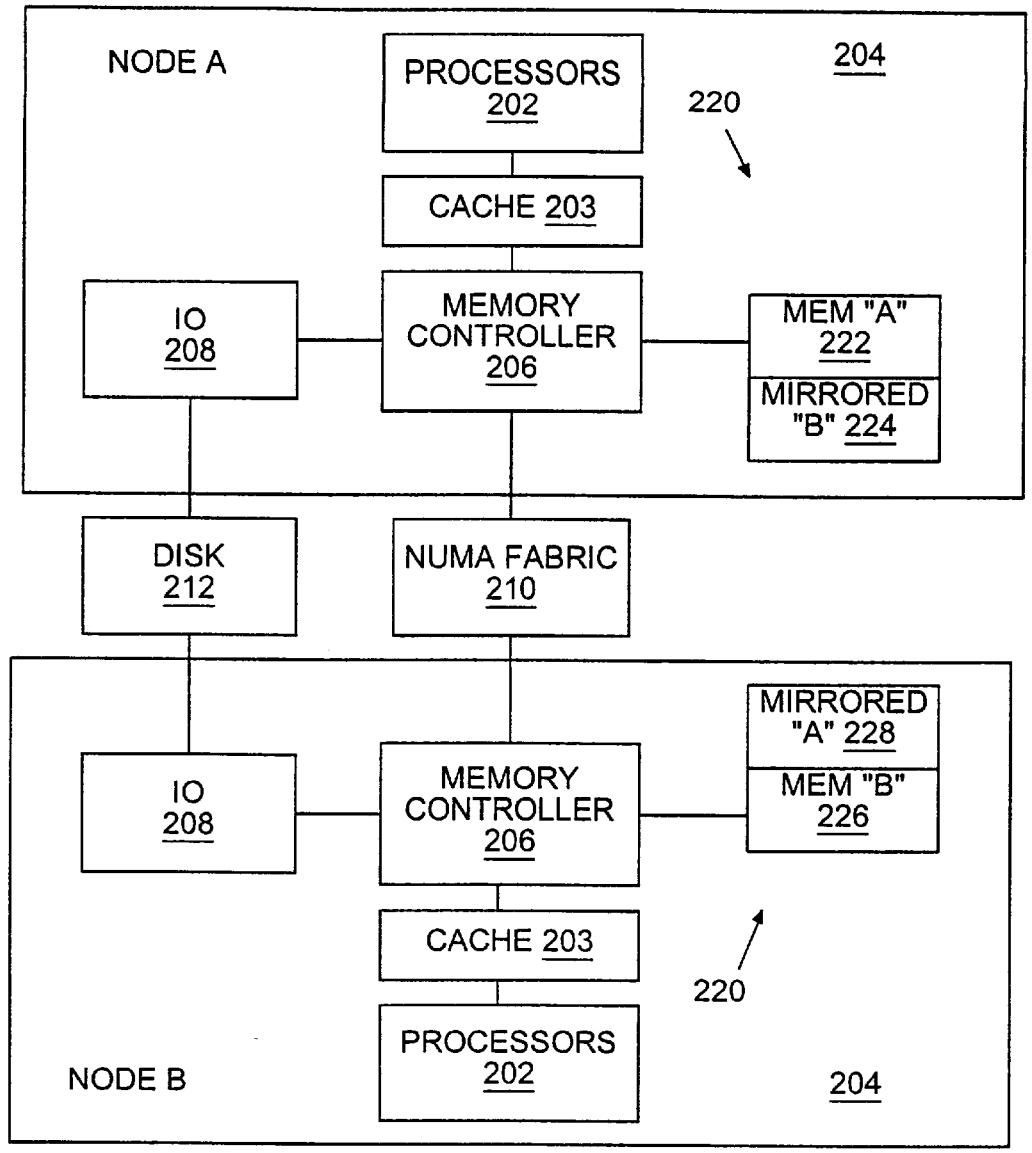
FIG. 2 is a block diagram of a data processing system according to one embodiment of the present invention.

Turning now to the drawings, FIG. 2 is a block diagram illustrating a data processing system 200 according to one embodiment of the present invention. System 200 includes two nodes 204b and 204b (generically or collectively referred to as node(s) 204), each of which comprises a distinct data processing device. Each node 204 may comprise an SMP machine in which one or more processors 202 are connected to a main memory 220 through a memory controller 206. Main memory 220 is a volatile, random access memory (RAM) such as an array of dynamic RAM (DRAM) devices. A NUMA fabric 210 enables each node 204 to access the main memory 220 of the other node and facilitates the maintenance of cache coherency across nodes 204. Thus, processors 202 in node 204a are able to access main memory 220 of node 204b while processors 2020 in node 204b are able to access main memory 220 of node 204a. For purposes of this disclosure, main memory 220 of node 204a is said to be "local" to processors 202 of node 204a while memory 220 of node 204b is "remote." Similarly, a local access refers to an intra-node access of main memory 220 from a processor 202 while a remote access refers to an inter-node access of main memory 220. In other words, a remote access of main memory 220 is an access to main memory from processor on the other side of switch 212.

In addition to main memories 220, the depicted embodiment of system 200 includes a persistent mass storage device identified as disk 212. Typically, disk 212 includes one or more hard disk units arranged in various configurations knowledge to one skilled in the field of mass storage device systems.

Typically an application will initially store data in its main memory 220 because the fast access times characteristic of DRAM devices are needed to achieve adequate system performance. To prevent loss of data, however, an application is periodically required to store the data in main memory 220 to disk 212. The frequency with which data in main memory 220 is archived in this manner is a fbnction of the rate at which data is accumulated and the ability to recreate the data. If data accumulates rapidly and is difficult or impossible to re-create, it is highly advisable to archive local memory data frequently. Unfortunately, however, application performance degrades as archive activity increases. Accesses to disk 212 are so time consuming, in fact, that application performance may be degraded by a factor as great as one third.

The present invention takes advantage of NUMA system architecture to reduce the extent to which data reliability is dependent upon relatively slow storage devices. Referring to FIG. 2, system 200 reduces the dependence upon disk 212 by using the main memories 220 of each node 204 to provide archived or redundant copies of data. Because each node 220 represents a logically and physically distinct device, loss of a node or data corruption on a node 204 does not necessarily result in data corruption on the remaining nodes of system 200. (Although only two nodes 204 are depicted in system 200 of FIG. 2, other embodiments of system 200 may include additional nodes 204 attached to switch 212).

In the two-node embodiment of system 200 depicted in FIG. 2, the main memories 220 on each node 204 are logically divided into two portions. A first portion of each main memory 220 is used to store data generated by applications running on the "local" processors 202 while a second portion of each main memory 220 is used to store a redundant or mirrored copy of data generated by applications running on the remote node (where a remote node refers to a node that is connected to a main memory 220 via switch 212). With reference to FIG. 2, main memory 220 of Node "A" 204 includes a first portion identified by reference numeral 222 that stores data generated by local applications (applications running on the processors 220 of Node "A") and a second portion identified by reference numeral 224 that stores a redundant or mirrored copy of data generated by remote applications (applications running on the processors 220 of Node "B"). Similarly, main memory 220 of Node "B" includes a first portion identified by reference numeral 226 that stores data generated by local applications (applications running on the processors 202 of Node "B") and a second portion that stores data generated remote applications (applications running on Node "A"). Thus, the two-node embodiment of NUMA system 200 applies RAID Level 1 principles to the segmented main memory that is characteristic of NUMA designs.

In this embodiment, if a processor 202 on a node 204 writes to its local main memory 220, the data is also simultaneously written to the local memory 220 on the remote node. Similarly, if a peripheral device (not depicted) of a node 204 executes a direct memory access (DMA) write to main memory 220, a copy of the data is simultaneously written to the local memory 220 on the remote node. In this manner, a redundant copy of all data stored in the NUMA system main memory (comprised of the individual main memories 220 of each node 204) is kept at all times.

Node "A" crashes due to a loss of power or some other event that results in loss of data in the main memory 220 of Node "A", the data may be recovered from the redundant copy of node "A." When a processor or DMA read is executed, the executing node 204 will attempt to read the data from the local main memory 220 first. If the data is not found in the local main memory, the read request may be re-tried using the main memory of a remote node. In one embodiment, the NUMA system 200 may continue to operate after a node 204 crashes or otherwise fails using only the main memory of one or more remaining functional nodes 204. If one or more nodes 204 has crashed, the NUMA system may execute in a "degraded" mode in which data is written to a single main memory 220 only. When the NUMA system 200 determines that degraded mode operation is required, system 200 may revert to a conventional operating mode in which disk 112 is used as the primary facility for reliably maintaining data.

Figure 3:
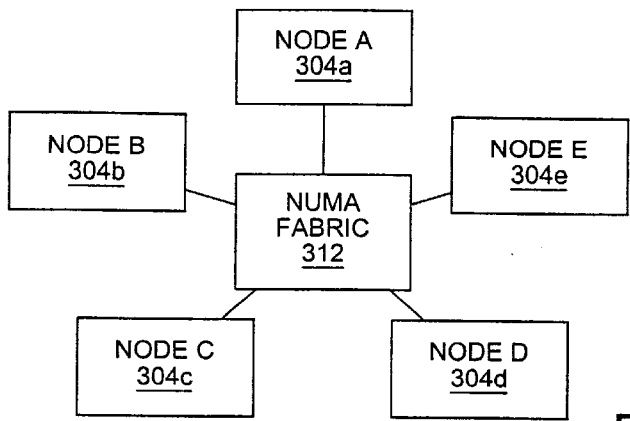
FIG. 3 is a block diagram of a data processing system according to one embodiment of the present invention.

In systems 200 incorporating more than two nodes, RAID Level 3, 4, and 5 techniques may be applied to the distributed main memory of the NUMA system to achieve improved utilization of the main memory. Referring to FIG. 3, an embodiment of NUMA system 200 according to one embodiment of the present invention includes five nodes 304a, 304b, 304c, 304d, and 304e (generically or collectively referred to as node(s) 304). Each node 304 is connected to NUMA fabric 312 and includes one or more processors connected to a local memory (also referred to as a main memory) similar to the nodes 204 illustrated and described with respect to FIG. 2. The switch 312 permits each node 304 to access the local memory of the other nodes and provides a mechanism that maintains coherence among the local memories.

Figure 4A:
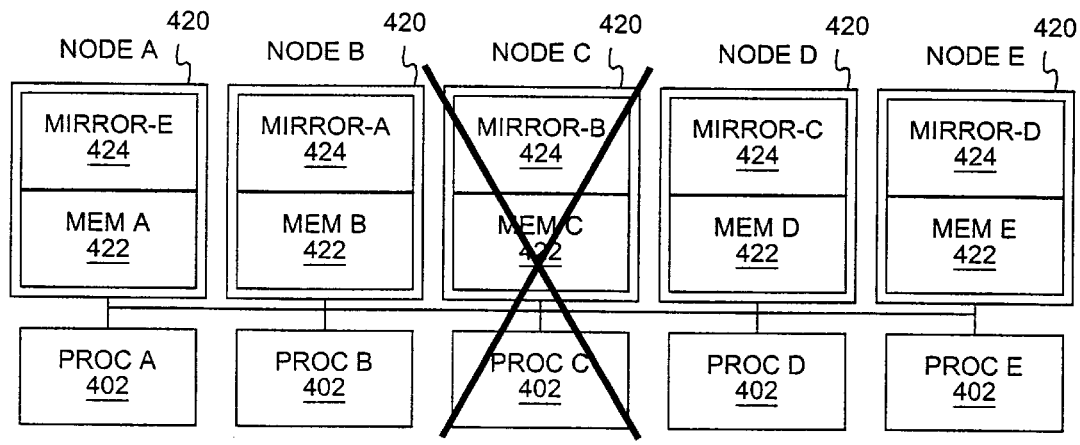
FIG. 4A is a conceptual representation of the main memory of the data processing system of FIG. 3 according to one embodiment of the invention following detection of an error one of the processors.
Figure 4B:
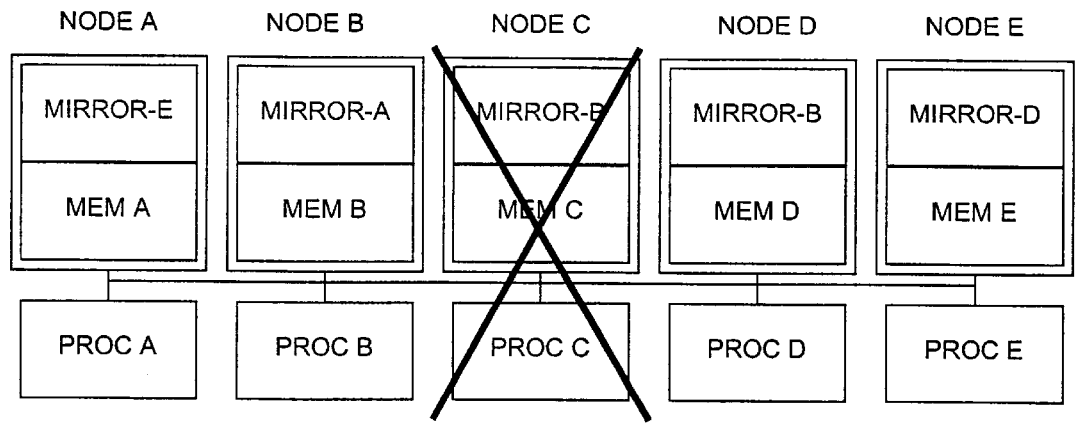
FIG. 4B is a conceptual representation of the main memory of FIG. 4A following a response to the detected error.
Figure 5:
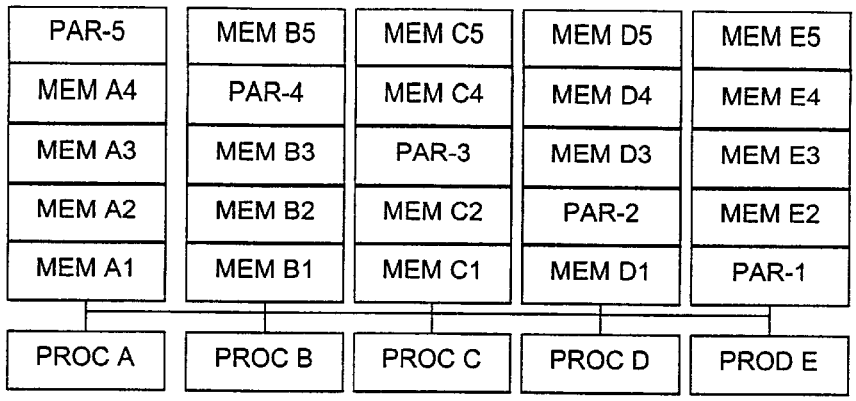
FIG. 5 is a conceptual representation of the main memory of the data processing system of FIG. 3 according to an alternative embodiment of the invention.

Exemplary memory implementations for the system 200 of FIG. 3 are illustrated in FIGS. 4A, 4B, and 5. In the implementation depicted in FIGS. 4A and 4B, the mirroring approached described with respect to FIG. 2 is expanded to a five node system. In the implementation of FIG. 5, the mirroring approached is replaced with a design in which the data stored in one of the local memories is indicative of the data stored in the remaining local memories. In this embodiment, the data stored in the local memory of a node 304 can be determined from the contents of the data stored in the remaining local memories if the node 304 crashes. This approach improves memory utilization for systems that include more than two nodes.

In the implementation illustrated in FIGS. 4A and 4B, each of the five local memories 420 is logically divided in half. One half of each local memory serves as the active memory 422 for the corresponding processor 402. The other half of each local memory 420 is used as a mirror portion 424 to provide a mirror copy of the active memory 420 of another node in the system. Thus, one half of the local memory of Node A serves as the active memory for Node A while the other half provides a mirror copy of the active memory of Node E. Similarly, one half of the local memory of Node B serves as the active memory for Node B while the other half provides a mirror copy of the active memory of Node A. When data is written to the active memory 422 of a node, the system responds by writing a copy of the data to the mirror portion 424 of the local memory 420 of another node within the system. In this manner, the active memory 422 of each node is backed up in the mirror portion 424 in the local memory 420 of one (and only one) of the other nodes. Although this memory implementation is expensive because 50% of the available memory is utilized for mirroring, it enjoys the advantage of simplicity.

FIGS. 4A and 4B illustrate operation of the NUMA system when a memory fault occurs. In FIG. 4A, the "X" through Node C indicates that the detection of a fault in the local memory of Node C. Upon detecting the fault, the NUMA system takes action sufficient to preserve the contents of Node C's local memory and to restore the system to operational condition. To accomplish the first goal, the system writes the contents of the mirror copy of Node C's local memory to a persistent storage device (not depicted in FIG. 4A). As depicted in FIG. 4A, the active memory of Node C is mirrored in the local memory of Node D. When a fault occurs in the local memory of Node C, the mirrored copy of Node C's active memory is copied to hard disk (or other suitable persistent storage device).

After the active memory of the faulty node has been preserved, system operation is resumed using the remaining nodes. The mirroring assignments of the remaining nodes are adjusted to account for the elimination of the defective node. Referring to FIG. 4B, the division of local memory of the NUMA system is illustrated following recovery from the crash of Node C. As illustrated in the drawing, the mirroring of Node B's active memory is reassigned from Node C to Node D (which was responsible for mirroring Node C's active memory before the crash). Following the resumption of normal operation, the system operates as a four-node system. If the previous contents of Node C are subsequently accessed by one or the remaining operational nodes, the contents must be retrieved from persistent storage. While this may limit performance temporarily following a node crash, the system as a whole is substantially immune to a crash on any of its nodes.

Figure 7:
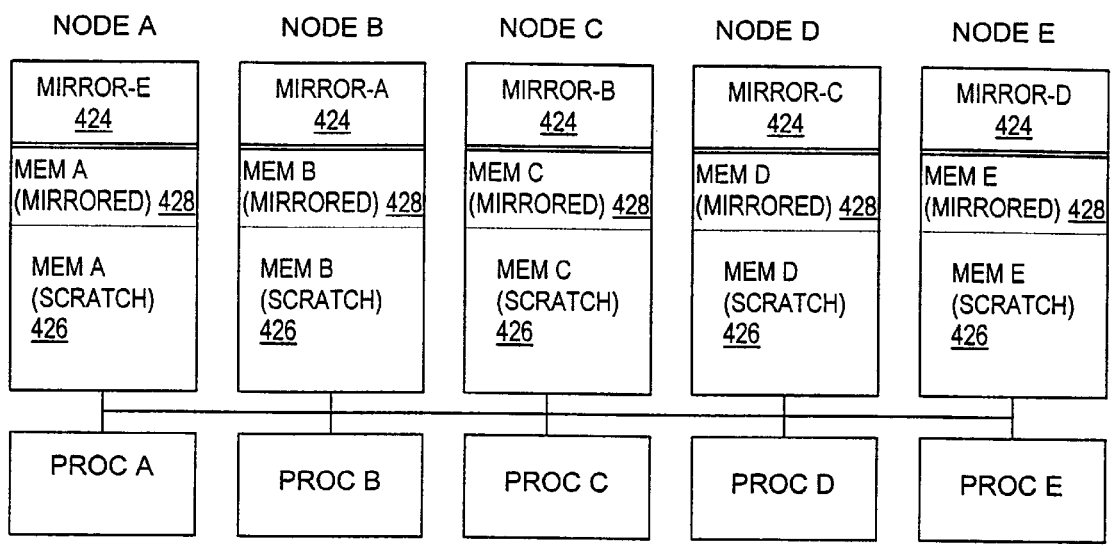
FIG. 7 is an alternative implementation to the main memory design depicted in FIG. 4A.

The embodiment depicted in FIG. 4A and FIG. 4B illustrates a design in which the active memory of each node is fully mirrored in the main memory of another node. Other embodiments, however, may implement a variation of this design in which only a portion of each node's active memory is mirrored in the main memory of another node. Referring to FIG. 7, for example, each node dedicates a larger portion of its local memory for active memory than for mirroring. Assuming each local memory is of equal size, the system cannot fully mirror the active memory of each node. Instead, the active memory of each node is logically divided into a relatively large scratch portion 426 and a relatively smaller mirrored portion 428. When data is stored to the scratch portion 426 of a node's active memory, the data is not mirrored in the local memory of another node. When data is stored to the mirrored portion 428 of a node's active memory, however, the data is mirrored in the mirror portion 424 of another node in the system. This embodiment preserves the security of selected portions of data while enabling each node to access a larger percentage of its local memory thereby effectively reducing memory costs for the system.

Turning now to FIG. 5, an alternative embodiment of the memory organization for a NUMA system according to one embodiment of the invention is illustrated. The embodiment depicted in FIG. 5 is designed to reduce memory costs by making more of the main memory available for applications and using less of the main memory for backup. As illustrated in FIG. 5, the main memory of each node is logically divided into five segments. (If the system includes four nodes, the main memory of each node is divided into four segments and so forth). Each memory segment represents a range of physical address locations. Alternatively, each segment may represent a range of logical or virtual addresses. Four of the segments are used as active memory to store application data for the corresponding node. (For purposes of this disclosure, application data may include any data written by an application program or operating system program). The fifth segment is used to store information that reflects the contents of the active memory contents of the other nodes. In this arrangement, 20% each node is dedicated for preserving data while 80% is available for application data.

When data is written to local memory a value is calculated based upon the data. The calculated value is then stored in the local memory of another node on the system. Typically, data is written to a specified memory location or address within a local memory of one of the nodes. The calculated value may be stored in the corresponding memory location of another node. The calculated value is indicative of the contents of the corresponding memory locations of the other nodes such that, if any one of the nodes becomes faulty, the data that was present in the faulty memory can be determined from the contents of the non-faulty nodes. The calculated values may be based on a variety of error checking algorithms such as checksum, parity, ECC, or any other suitable algorithm. The remainder of the discussion emphasizes an embodiment in which parity is used.

In the embodiment illustrated in FIG. 5, the local memory of each node is logically divided into five segments. Four of the segments are used as the nodes active memory while the fifth segment (referred to as the parity memory segment) stores parity values generated based upon the contents of corresponding segments of the other nodes. The first four segments of Node 1 (identified as MEM A1, MEM A2, MEM A3, and MEM A4), for example, represent active memory. The fifth segment (PAR 5), however, stores parity information that reflects the contents of the corresponding segments of Nodes B, C, D, and E (i.e., segments MEM B5, MEM C5, MEM D5, and MEM E5). When the system is booted, the local memory (including the parity memory segment) of each node assumes an initial state such as all 0's. Thereafter, when an application writes data to an active memory location in one of the nodes, the corresponding parity memory location is updated to reflect the data that was written. If, for example, data is written to a memory location in the second segment MEM B2 of Node B, the corresponding memory location in the second parity segment PAR 2, which is located on the local memory of Node D, is updated to reflect the data that was written to MEM B2.

The parity memory segments PAR 1, 2, 3, 4, and 5 are distributed throughout the nodes of the NUMA system in the embodiment depicted in FIG. 5 such that each node includes a parity memory segment. The parity value stored in any location of a parity memory segment may be calculated as the exclusive-or (XOR) product of the data values in the corresponding memory locations of the other nodes. Thus, if $b_0$, $b_1$, $b_2$, and $b_3$ represent corresponding bytes in the local memories of node A, B, C, and D respectively, the corresponding parity bit $p_b$ in the parity segment of Node E may be calculated by the equation $p_b = b_0 \oplus b_1 \oplus b_2 \oplus b_3$. The correspondence between bits in each of the local memories may be based on physical address. As an example, the bits in the memory location with physical address 0x00000000 in each local memory may correspond to one another such that, when physical address 0x00000000 in local memory 0 is written, physical address 0x00000000 in the parity local memory (i.e., local memory 4) is recalculated and rewritten based upon the data in physical address 0x0000000 of local memories 0, 1, 2, and 3.

In the implementation depicted in FIG. 5, the memory utilization is significantly greater than the utilization achieved with the mirroring implementation depicted in FIG. 2. As an example, the memory utilization of the implementations illustrated in FIG. 5 is 80%. In other words, 16 of the 20 total memory blocks in system 200 are used to store application data while only four of the blocks are required for parity. In contrast, the mirroring approach illustrated in FIG. 2 achieves only 50% utilization since every piece of application data is stored in two locations. Even greater memory utilization is obtaining if the number of nodes is increased.

Figure 6:
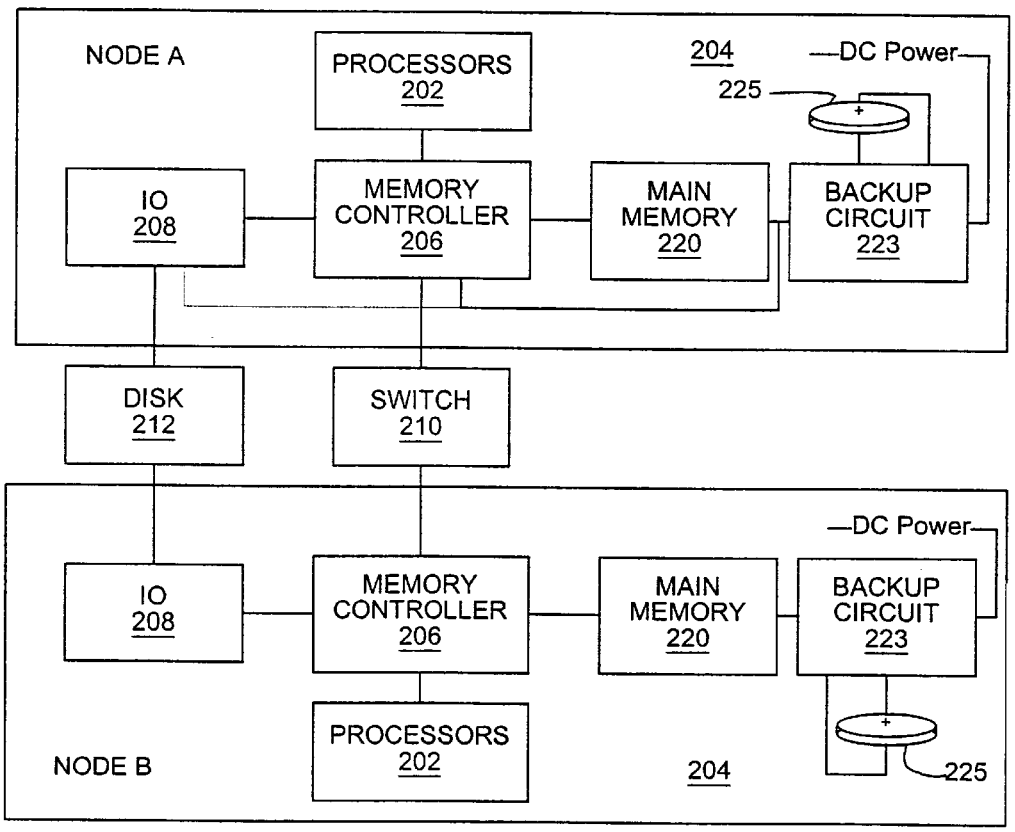
FIG. 6 is a block diagram of an embodiment of the present invention employing a continuously powered main memory design.

Referring now to FIG. 6, an implementation of a NUMA system 200 is depicted in which power to the local memory of each node is maintained during power disruptions. In the depicted embodiment, each main memory 220 is connected to a backup circuit 223. Typically, main memory 220 is implemented with CMOS technology and includes an array of memory cells. The entire array is typically powered with a single DC voltage signal commonly referred to as Vdd. During normal operation, Vdd is produced by a power supply driven by an AC voltage such as a standard 115 V 60 Hz signal. The Vdd signal is provided to backup circuit 223 as an input. In addition, a battery 225 provides a second DC voltage signal input to backup circuit 223. The output of the backup circuit 223 is a DC voltage signal that is provided to the local memory 220 of each node 204. If the Vdd signal drops below a predetermined level, such as the minimum specified voltage for operating local memory 220, backup circuit 220 senses the drop in voltage and selects the DC voltage supplied by battery 225 as the voltage signal that is supplied to local memory 220.

In addition to powering the memory cell array of local memory 220, backup circuit 223 may also provide DC power to memory controller 206. When backup circuit 223 switches to battery power in response to detecting a power failure, a power supply fault is typically indicated and, presumably, processors 202 and I/O adapters 208 are non-functional. Accordingly, memory controller 206 may be configured wherein, upon determining that it is being powered by battery 225, memory controller 206 enters a refresh only mode in which only the minimum circuitry needed to maintain the contents of main memory 220 is driven. In another embodiment, backup circuit 223 may supply IO adapter 208 with power. In this embodiment, IO adapter 208 is preferably configured to initiate a hard disk backup of the contents of main memory 220 in response to detecting that battery 225 is powering the main memory.

It will be apparent to those skilled in the art having the benefit of this disclosure that the present invention contemplates the use of the described techniques to improve the performance and reliability of NUMA systems by applying secondary storage techniques to the main memory of the system. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A method of managing data in a multi-node data processing system having N nodes, wherein each node includes a corresponding main memory, comprising:

storing new data in a first node main memory of the data processing system;

calculating parity information based on the new data and data stored in the main memory of at least one other node;

storing the parity information in the main memory of a node other than the first node.

2. The method of claim 1, wherein the parity information is stored in the main memory of a second node and further wherein the parity information is calculated based on data in each of the remaining nodes.

3. The method of claim 1, wherein the main memory node in which the parity information is stored depends on the memory address in the first node main memory to which the new data is stored.

4. The method of claim 3, wherein a portion of each main memory comprises parity information.

5. The method of claim 4, wherein the data processing system includes N nodes and wherein 1/Nth of each main memory node is reserved for parity information.

6. The method of claim 1, further comprising, upon detecting a power failure of the first node, connecting the first node main memory to a battery to preserve its contents.

7. The system of claim 4, wherein the data processing system includes N nodes and wherein 1/Nth of each main memory node is reserved for parity information.

8. A data processing system comprising:
 a first node including a first node main memory and a first processor;
 a second node including a second node main memory and a second processor,
 a third node including a third node main memory and a third processor;
 a fabric connecting the first, second, and third nodes; and
 a persistent storage device;
 wherein the system is configured, upon storing new data in the first node main memory, to store error correction data in the main memory of at least one of the other nodes wherein the error correction data is determined based, at least in part, upon the new data and the data stored in the main memory of the remaining node.

9. The system of claim 8, wherein the error correction data is parity data determined from data in each of the other main memories.

10. The method of claim 9, wherein the main memory node in which the parity data is stored depends on the memory address in the first node main memory to which the new data is stored.

11. The system of claim 10, wherein a portion of the main memory of each of the nodes comprises parity information.

12. A multi-node, non-uniform memory architecture (NUMA) data processing system, wherein each node includes a processor and a corresponding main memory, comprising:
 means for dividing the main memory of each node into N segments, where N is the number of nodes in to system;
 means for allocating one segment of each node for storing error correction data, wherein the error correction data is indicative of data in the corresponding segments of the other main memories;
 means, responsive to storing new data in a first segment of a first node main memory for determining error correction information based on the new data; and
 means for staring the determined error correction information in the first segment of another node.

13. The system of claim 12, wherein te means for allocating the error correction segments comprises means for allocating the error correction segments wherein no two error correction segments occupy the same segment of their respective memories.

* * * * *